United States Patent
Dyer et al.

(10) Patent No.: US 11,048,256 B2
(45) Date of Patent: Jun. 29, 2021

(54) PARKING BEHAVIORS FOR AUTONOMOUS VEHICLES

(71) Applicant: Waymo LLC, Mountain View, CA (US)

(72) Inventors: John Wesley Dyer, Mountain View, CA (US); Michael Epstein, Danville, CA (US); Konstantin Pervyshev, Menlo Park, CA (US); Jonathan Lee Pedersen, Palo Alto, CA (US); Salil Pandit, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 168 days.

(21) Appl. No.: 16/536,560

(22) Filed: Aug. 9, 2019

(65) Prior Publication Data

US 2021/0041870 A1    Feb. 11, 2021

(51) Int. Cl.
*G05D 1/00* (2006.01)
*G05D 1/02* (2020.01)
(Continued)

(52) U.S. Cl.
CPC .......... *G05D 1/0088* (2013.01); *B60W 30/06* (2013.01); *B60W 60/00* (2020.02); *B62D 6/00* (2013.01);
(Continued)

(58) Field of Classification Search
CPC ........ G05D 1/0088; G05D 1/021; G05D 1/00; B60W 2050/0089; B60W 2556/10;
(Continued)

(56) References Cited

U.S. PATENT DOCUMENTS 8,560,175 B2 * 10/2013 Bammert ........... B62D 15/0285
                                                      701/41
8,903,567 B2    12/2014 Morimoto et al.
(Continued)

FOREIGN PATENT DOCUMENTS

KR    20180053081 A    5/2018
KR    20180130313 A    12/2018
KR    20190091366 A    8/2019

OTHER PUBLICATIONS

Maxim Likhachev and Dave Ferguson, Planning Long Dynamically-Feasible Maneuvers for Autonomous Vehicles, University of Pennsylvania Scholarly Commons Lab Papers (GRASP), Jun. 25, 2008, pp. 1-10.
(Continued)

*Primary Examiner* — Yonel Beaulieu
(74) *Attorney, Agent, or Firm* — Botos Churchill IP Law

(57) ABSTRACT

Aspects of the disclosure relate to parking behaviors and maneuvering a vehicle in an autonomous driving mode accordingly. For instance, a pullover location for the vehicle to stop and wait for a passenger may be identified. The vehicle may be maneuvered in the autonomous driving mode in order to pull over by pulling forward into the pullover location. Whether to maneuver the vehicle in reverse in the pullover location before or after the passenger enters the vehicle may be determined based on context for the pull over with respect to the passenger. The vehicle may be maneuvered in the autonomous driving mode in reverse based on the determination of whether to maneuver the vehicle in reverse in the pullover location before or after the passenger enters the vehicle.

22 Claims, 10 Drawing Sheets

(51) Int. Cl.
*G08G 1/16* (2006.01)
*B60W 60/00* (2020.01)
*B60W 30/06* (2006.01)
*B62D 6/00* (2006.01)
*B62D 15/02* (2006.01)

(52) U.S. Cl.
CPC ............ *B62D 15/02* (2013.01); *G05D 1/021* (2013.01); *G08G 1/16* (2013.01)

(58) Field of Classification Search
CPC .. B60W 60/0025; B60W 60/00; B60W 30/06; B62D 15/0285; B62D 6/00; B62D 15/02; G08G 1/16
See application file for complete search history.

(56) References Cited

U.S. PATENT DOCUMENTS

| | | | |
|---|---|---|---|
| 9,523,984 B1 | 12/2016 | Herbach et al. | |
| 10,241,508 B2 | 3/2019 | Fairfield et al. | |
| 10,311,731 B1* | 6/2019 | Li | G08G 1/146 |
| 10,325,502 B2* | 6/2019 | Colella | B62D 15/028 |
| 10,775,788 B2* | 9/2020 | Kim | B60R 25/23 |
| 10,793,143 B2* | 10/2020 | Lee | B60W 30/06 |
| 10,909,866 B2* | 2/2021 | Jacobus | H04L 67/125 |
| 2007/0075875 A1* | 4/2007 | Danz | B60Q 9/006 340/932.2 |
| 2011/0054739 A1* | 3/2011 | Bammert | B62D 15/0285 701/41 |
| 2017/0229020 A1* | 8/2017 | Colella | B60W 10/20 |
| 2018/0136655 A1* | 5/2018 | Kim | B60N 2/002 |
| 2018/0164830 A1* | 6/2018 | Moosaei | G05D 1/0246 |
| 2018/0170365 A1* | 6/2018 | Shani | E04H 6/424 |
| 2018/0304926 A1* | 10/2018 | Ghose | B62D 15/027 |
| 2018/0339700 A1* | 11/2018 | Lee | B60W 30/06 |
| 2019/0137290 A1* | 5/2019 | Levy | G01C 21/3461 |
| 2019/0156678 A1* | 5/2019 | Cole | B62D 15/0285 |
| 2020/0150660 A1* | 5/2020 | Kim | B60R 25/24 |

OTHER PUBLICATIONS

International Search Report and Written Opinion for Application No. PCT/US2020/045406 dated Nov. 27, 2020.

* cited by examiner

PARKING BEHAVIORS FOR AUTONOMOUS VEHICLES

BACKGROUND

Autonomous vehicles, such as vehicles which do not require a human driver when operating in an autonomous driving mode, may be used to aid in the transport of passengers or items from one location to another. When an autonomous vehicle, which may not have a driver, is preparing to pull over in order to pick up a passenger certain parking maneuvers, such as parallel parking (involving pulling alongside of a parking spot and reversing into that parking spot) can be difficult and sometimes dangerous maneuvers. For example, it can take quite a long time to complete a parallel parking maneuver, during which a passenger may unknowingly attempt to enter the vehicle before the vehicle is fully parked creating a possibly uncomfortable situation. In addition, the vehicle's computing devices may not be able to pick up on social cues from drivers of other nearby vehicles who may pull very close behind the vehicle or who may try to pull into the same spot without reversing. In some instances, this can be avoided by always attempting to find very long pullover locations from which the vehicle never has to use a parallel parking maneuver or to reverse in order to pull out. Of course, this may not always be possible and may result in a vehicle making one or more loops "around the block" before being able to pull over and wait for a passenger.

BRIEF SUMMARY

One aspect of the disclosure provides a method of maneuvering a vehicle having an autonomous driving mode. The method includes identifying, by one or more processors, a pullover location for the vehicle to stop and wait for a passenger; maneuvering, by the one or more processors, the vehicle in the autonomous driving mode in order to pull over by pulling forward into the pullover location; determining, by the one or more processors, whether to maneuver the vehicle in reverse in the pullover location before or after the passenger enters the vehicle based on context for the pull over with respect to the passenger; and maneuvering, by the one or more processors, the vehicle in the autonomous driving mode in reverse based on the determination of whether to maneuver the vehicle in reverse in the pullover location before or after the passenger enters the vehicle.

In one example, the method also includes, when maneuvering the vehicle in order to pull over by pulling forward into the pullover location, adjusting a minimum distance for the vehicle with respect to other objects in order to maneuver the vehicle within the adjusted minimum distance of another object in front of the vehicle. In another example, the method also includes the context by determining that a pedestrian is within a predetermined threshold distance of the pullover location, and wherein maneuvering the vehicle in reverse includes maneuvering the vehicle in reverse after the passenger enters the vehicle. In another example, the method also includes determining the context by determining that no pedestrian is within a predetermined threshold distance of the pullover location, and wherein maneuvering the vehicle in reverse includes maneuvering the vehicle in reverse before the passenger enters the vehicle.

In another example, the method also includes determining the context by determining an expected amount of time for the passenger to reach the vehicle once the vehicle is ready to be maneuvered in reverse in the pullover location, and comparing the expected amount of time to a threshold value. In this example, the determination of whether to maneuver the vehicle in reverse in the pullover location before or after the passenger enters the vehicle is further based on the comparison. In addition, maneuvering the vehicle in reverse includes maneuvering the vehicle in reverse before the passenger enters the vehicle when the comparison indicates that the expected amount of time is greater than the threshold value. Alternatively, maneuvering the vehicle in reverse includes maneuvering the vehicle in reverse after the passenger enters the vehicle when the comparison indicates that the expected amount of time is less than the threshold value. In addition or alternatively, determining the expected amount of time is based on location information for a client computing device associated with the passenger. In this example, determining the expected amount of time is further based on a predetermined walking speed for pedestrians. In addition or alternatively, determining the expected amount of time is based on historical data indicating how long it has taken the passenger to reach one or more vehicles for a pick up in the past. In addition or alternatively, determining the expected amount of time is based on historical data indicating an expected amount of time for passengers to reach one or more vehicles for a pick up. In addition or alternatively, determining the expected amount of time is based on historical data indicating an expected amount of time for passengers to reach one or more vehicles for a pick up at a predetermined time of day. In addition or alternatively, determining the expected amount of time is based on historical data indicating an expected amount of time for passengers to reach one or more vehicles for a pick up on a predetermined day of the week. In addition or alternatively, determining the expected amount of time is based on historical data indicating an expected amount of time for passengers to reach one or more vehicles for a pick up at the pullover location. In addition or alternatively, determining the expected amount of time is based on historical data indicating an expected amount of time for passengers to reach one or more vehicles for a pick up at a geographic region including the pullover location and one or more additional pullover locations.

In another example, the method also includes determining the context by determining that a pedestrian who is making progress towards the vehicle is within a predetermined distance of the pullover location, and wherein maneuvering the vehicle in reverse includes maneuvering the vehicle in reverse after the passenger enters the vehicle. In another example, the method also includes determining the context by determining that no pedestrian who is making progress towards the vehicle is within a predetermined distance of the pullover location, and wherein maneuvering the vehicle in reverse includes maneuvering the vehicle in reverse after the passenger enters the vehicle. In another example, the method also includes determining the context by determining that a communication link has been established between one or more computing devices of the vehicle and a client computing device associated with the passenger, and wherein maneuvering the vehicle in reverse includes maneuvering the vehicle in reverse after the passenger enters the vehicle. In another example, the method also includes determining the context by determining that no communication link has been established between one or more computing devices of the vehicle and a client computing device associated with the passenger, and wherein maneuvering the vehicle in reverse includes maneuvering the vehicle in reverse before the passenger enters the vehicle. In another example, the method also includes determining the context by determining that location information for a client computing device associated with the passenger is within a predetermined threshold distance of the vehicle, and wherein maneuvering the vehicle in reverse includes maneuvering the vehicle in reverse after the passenger enters the vehicle. In another example, the method also includes determining the context by determining that location information for a client computing device associated with the passenger is not within a predetermined threshold distance of the vehicle, and wherein maneuvering the vehicle in reverse includes maneuvering the vehicle in reverse before the passenger enters the vehicle. In another example, the method also includes maneuvering the vehicle in reverse includes maneuvering the vehicle in reverse before the passenger enters the vehicle, and the method further comprises providing a notification to indicate to the passenger that the passenger should wait for the vehicle to complete a reversing maneuver before attempting entering the vehicle.

DETAILED DESCRIPTION

Overview

Figure 1:
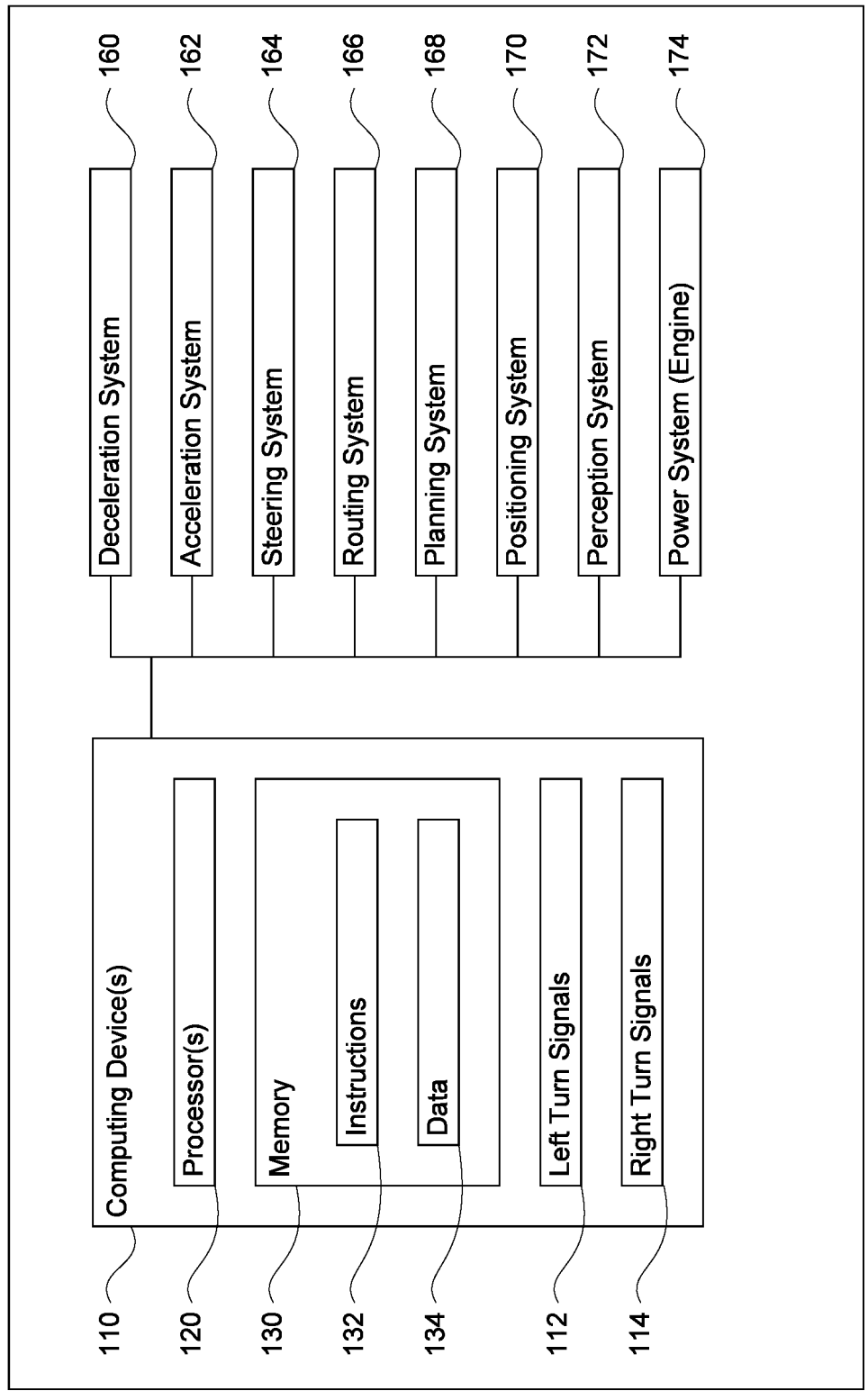
FIG. 1 is a functional diagram of an example vehicle in accordance with an exemplary embodiment.

The technology relates to parking behaviors for autonomous vehicles. For instance, when an autonomous vehicle, which may not have a driver, is preparing to pull over in order to pick up a passenger certain parking maneuvers, such as parallel parking (involving pulling alongside of a parking spot and reversing into that parking spot) can be difficult and sometimes dangerous maneuvers. For example, it can take quite a long time to complete a parallel parking maneuver, during which a passenger may unknowingly attempt to enter the vehicle before the vehicle is fully parked creating a possibly uncomfortable situation. In addition, the vehicle's computing devices may not be able to pick up on social cues from drivers of other nearby vehicles who may pull very close behind the vehicle or who may try to pull into the same spot without reversing. In some instances, this can be avoided by always attempting to find very long pullover locations from which the vehicle never has to use a parallel parking maneuver or to reverse in order to pull out. Of course, this may not always be possible and may result in a vehicle making one or more loops "around the block" before being able to pull over and wait for a passenger. To avoid such situations, rather than performing a parallel parking maneuver and/or only looking for very long places to pull over, other driving behaviors may be implemented.

For instance, before a vehicle is pulled over, for example to pick up or drop off a passenger, the vehicle's computing devices may first identify a place to pull over. This may include identifying an area where the vehicle is permitted to park, for instance by identifying a set of predetermined pullover locations in pre-stored map information or by identifying a possible spot by searching for an area on a side of a road long enough for the vehicle to pull forward into and stop. Of these set of predetermined pullover locations and/or possible pullover locations, the vehicle's computing devices may select an available pullover location.

Once a vehicle is ready to pull over into an identified pullover location, the vehicle's planning system may implement pull over behavior. This may involve pulling forward into the identified pullover location and stopping the vehicle. In some instances, this may require that the vehicle reverse (i.e. back up) before being able to pull out of the identified pullover location.

At this point or shortly before when the vehicle is approaching or pulling into the identified pullover location, the vehicle's computing devices may determine whether the vehicle should immediately reverse in order to create a gap between the vehicle and another object. In order to determine whether the vehicle should immediately reverse or wait for a passenger to enter the vehicle, the vehicle's computing devices may determine context for the pull over with respect to the passenger for the vehicle. For instance, this context may indicate, among other things, whether the actual passenger (i.e. an assigned passenger) or a potential passenger (i.e. a pedestrian who may be the passenger) is nearby. Based on this context, the vehicle's computing devices should wait for the passenger to enter the vehicle before maneuvering the vehicle in reverse. If the context indicates that the actual passenger or a potential passenger is not nearby the vehicle, the vehicle's computing devices may maneuver the vehicle in reverse before the passenger enters the vehicle. This may include reversing away from an object in front of the vehicle.

In one instance, determining the context may include determining an expected amount of time for the passenger to reach or arrive at the vehicle. In addition or alternatively, determining the context may include determining whether there are any pedestrians nearby. In addition or alternatively, determining the context may include determining whether there are any pedestrians who are actively making progress towards the vehicle. In addition or alternatively, determining the context may include determining whether the vehicle's computing devices have established communications with and/or authenticated a client computing device associated with the passenger. In addition or alternatively, determining the context may include determining whether location information for a client computing device of the passenger indicates that the passenger is nearby the vehicle.

The features described herein may enable an autonomous vehicle to implement specific parking behaviors. As noted above, these parking behaviors may improve the ability for the computing devices of a vehicle having an autonomous driving mode to find available pullover locations while doing so safely and avoiding parallel parking maneuvers. In other words, because the vehicle is able to find smaller parking locations (for instance, a 5.1-5.2 meter long van may be able to pull over in an 8 to 10 meter pullover location as opposed to a 15 or more meter pullover location), the vehicle may be more likely to find a pullover location to wait for a passenger and less likely to have to loop around one or more times before doing so. In addition, because the timing of when a vehicle reverses in a pullover location is dependent upon the context for the pull over with respect to a potential or actual passenger for the vehicle, this may avoid situations in which the vehicle stops and an unknowing passenger attempts to enter the vehicle just before or while the vehicle is reversing, which again can be dangerous for the passenger.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

In one aspect the computing devices 110 may be part of an autonomous control system capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 134 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle.

Routing system 166 may be used by the computing devices 110 in order to generate a route to a destination. planning system 168 may be used by computing device 110 in order to follow the route. In this regard, the planning system 168 and/or routing system 166 may store detailed map information, e.g., highly detailed maps identifying the shape and elevation of roadways, lane lines, intersections, crosswalks, speed limits, traffic signals, buildings, signs, real time traffic information, pull over spots vegetation, or other such objects and information.

Figure 2:
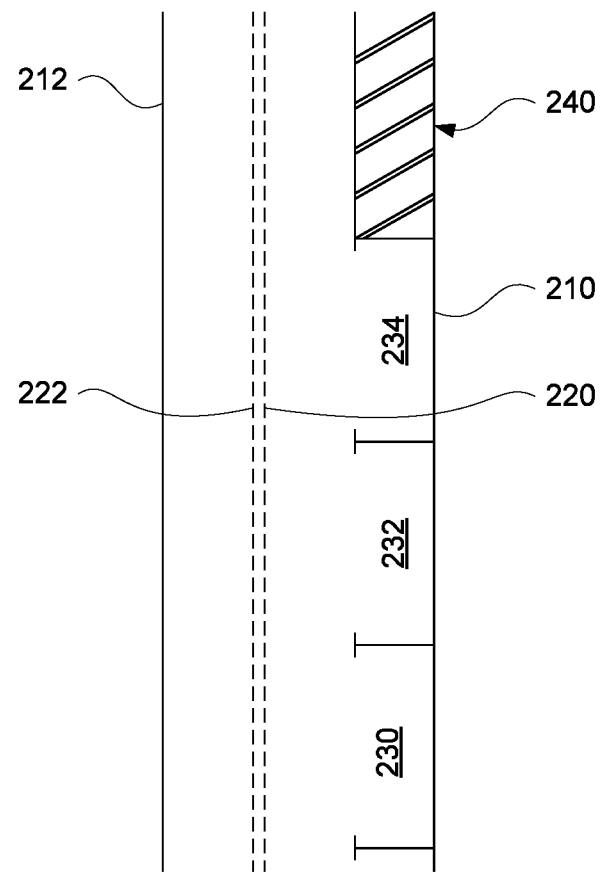
FIG. 2 is an example of map information in accordance with aspects of the disclosure.

FIG. 2 is an example of map information 200 for a section of roadway including. The map information 200 may be a local version of the map information stored in the memory 130 of the computing devices 110. In this example, the map information 200 includes information identifying the shape, location, and other characteristics of curbs 210, 212, lane lines 220, 222, parking spots 230, 232, 234, as well as loading zone 240. Only a few such features are depicted in FIG. 2, however, the map information 200 may include significantly more features and details in order to enable the vehicle 100 to be controlled in the autonomous driving mode.

Although the map information is depicted herein as an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with the computing devices of the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
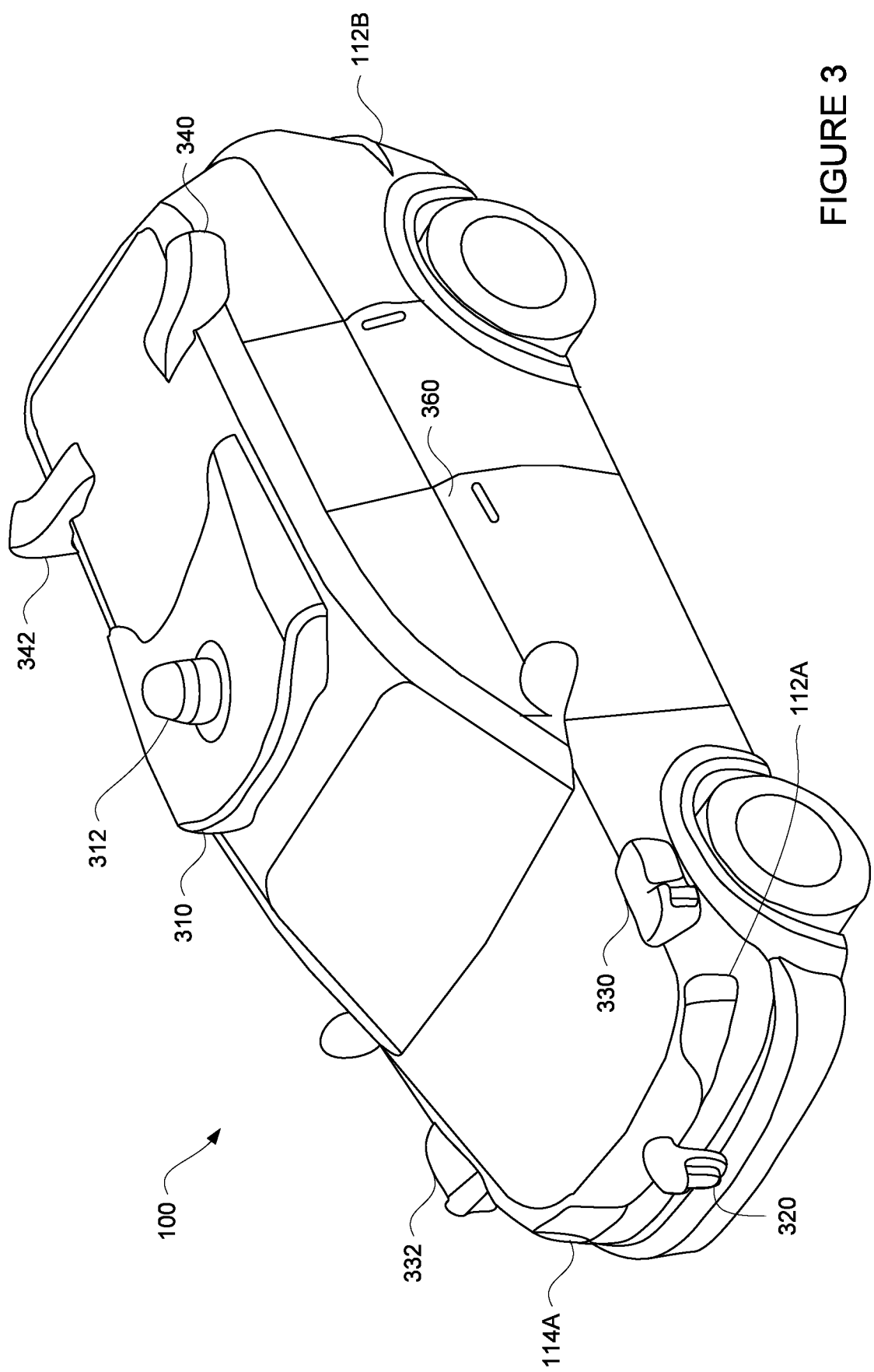
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. FIG. 3 also depicts left and right turn signals 112, 114. In this example, front left turn signal 112A, rear left turn signal 112B, and front right turn signal 114A are depicted, but a right rear turn signal is not visible from the perspective of FIG. 3.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 168, positioning system 170, perception system 172, and power system 174 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planning system software module of the planning system 168. The planning system may use this input to generate trajectories for the vehicle to follow for some brief period of time into the future based on a route generated by a routing module of the routing system 166. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals 112 or 114 of the signaling system). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
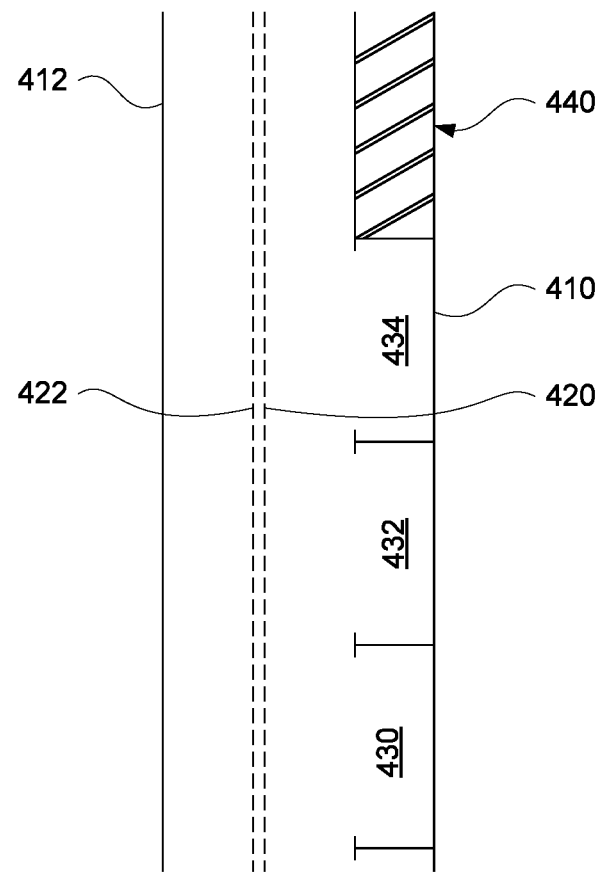
FIG. 4 is an example of a section of roadway corresponding to the map information of FIG. 2 in accordance with aspects of the disclosure.
Figure 5:
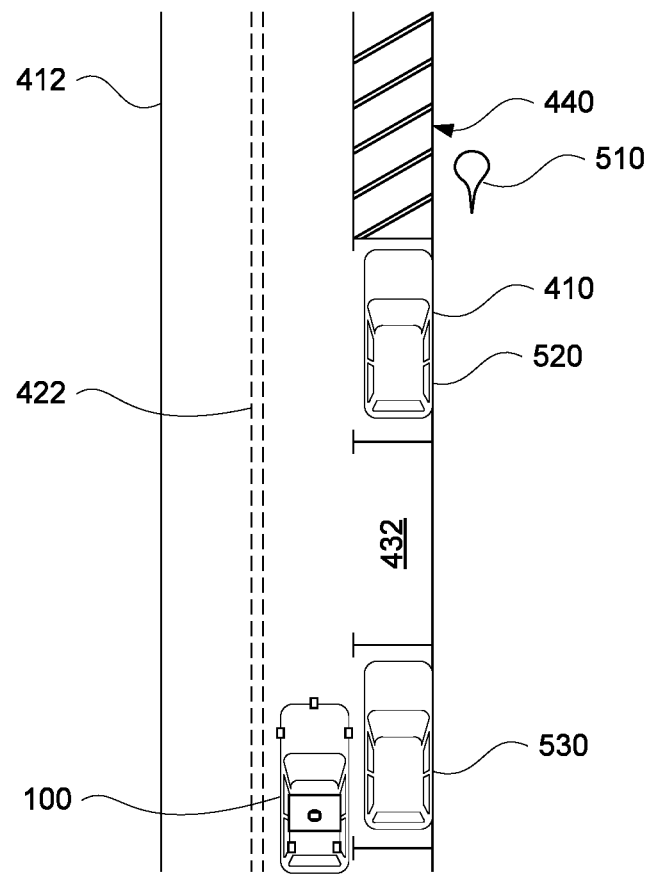
FIG. 5 is an example of a vehicle having an autonomous driving mode in the section of roadway of FIG. 4 in accordance with aspects of the disclosure.

FIG. 4 is an example representation of a section of roadway 400 corresponding to the map information 200. In this regard, the shape, location, and other characteristics of curbs 410, 412 may correspond to curbs 210, 212, lane lines 420, 422 may correspond to lane lines 220, 222, parking spots 430, 432, 434 may correspond to parking spots 230, 232, 234, and loading zone 440 may correspond to loading zone 240. FIG. 5 is an example representation of vehicle 100 on the section of roadway 400 approaching a pickup location represented by the location marker 510.

Figure 10:
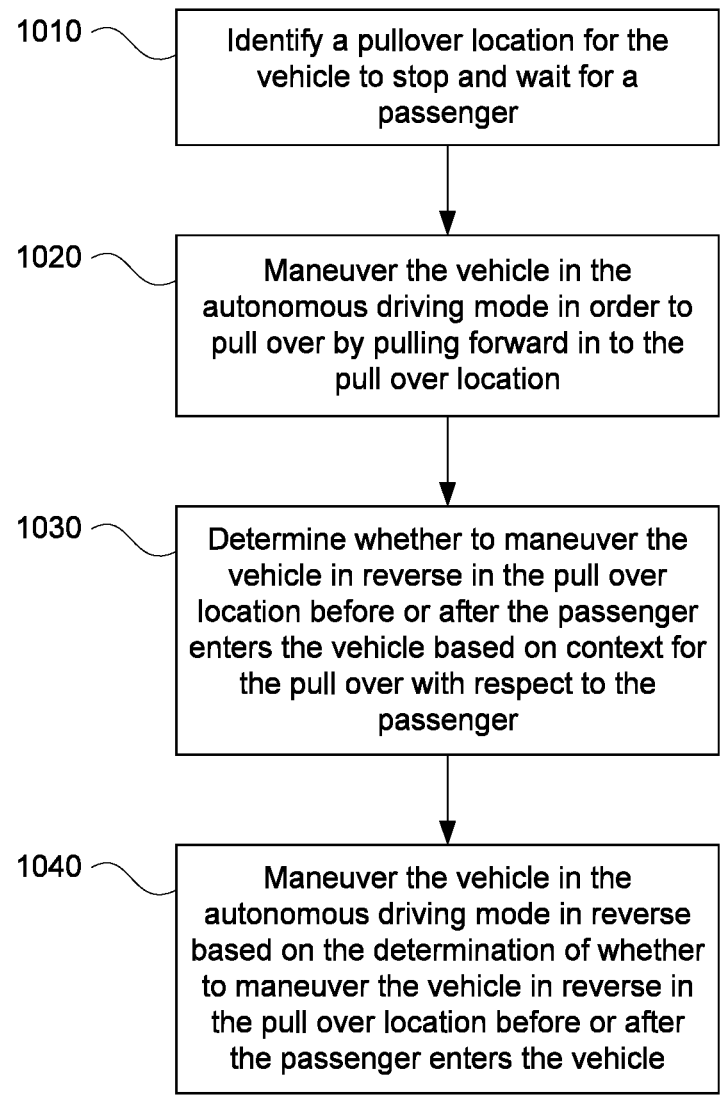
FIG. 10 is an example flow diagram in accordance with aspects of the disclosure.

FIG. 10 is an example flow diagram 1000 in accordance with aspects of the disclosure which may be performed by one or more processors of one or more computing devices, such as processors 120 of computing devices 110, in order to maneuver a vehicle having an autonomous driving mode. In this example, at block 1010, a pullover location for the vehicle to stop and wait for a passenger is identified. In other words, before vehicle 100 can pull over, for example to pick up or drop off a passenger, the computing devices 110 may first identify a place for vehicle 100 to pull over. This may include identifying an area where the vehicle is permitted to park, for instance by identifying a set of predetermined pullover locations in the map information 200, such as parking spots 230, 232, 234 of FIG. 2, or by identifying a possible pullover location by searching for an area on a side of a road long enough for the vehicle to pull forward into and stop. In some instances, the computing devices 110 may also identify loading zone 240 as a possible pullover location either based on the map information 200 or by determining that the area of the loading zone 440 is large enough for vehicle 100 to safely park.

Of these set of predetermined pullover locations and/or possible pullover locations, the computing devices 110 may identify or select an available pullover location where the pullover location is available and still wide enough (i.e. not partially occupied) such that the vehicle is able to pull into the pullover location. For instance, returning to FIG. 5, the computing devices may determine that parking spots 430 and 434 (or parking spots 230 and 234) are occupied, here by vehicles 520 and 530, respectively. In this regard, the computing devices 110 may identify parking spot 230 (or parking spot 232) and in some instances, loading zone 440 (or loading zone 240) as available. The computing devices 110 may then select from loading zone 440 and parking spot 430. In this example, it may be preferable to identify or select parking spot 430 as the vehicle 100 may be able to wait longer for a passenger in parking spot 430 than in loading zone 440, even though the loading zone 440 is closed to the location of the location marker 510.

Figure 6:
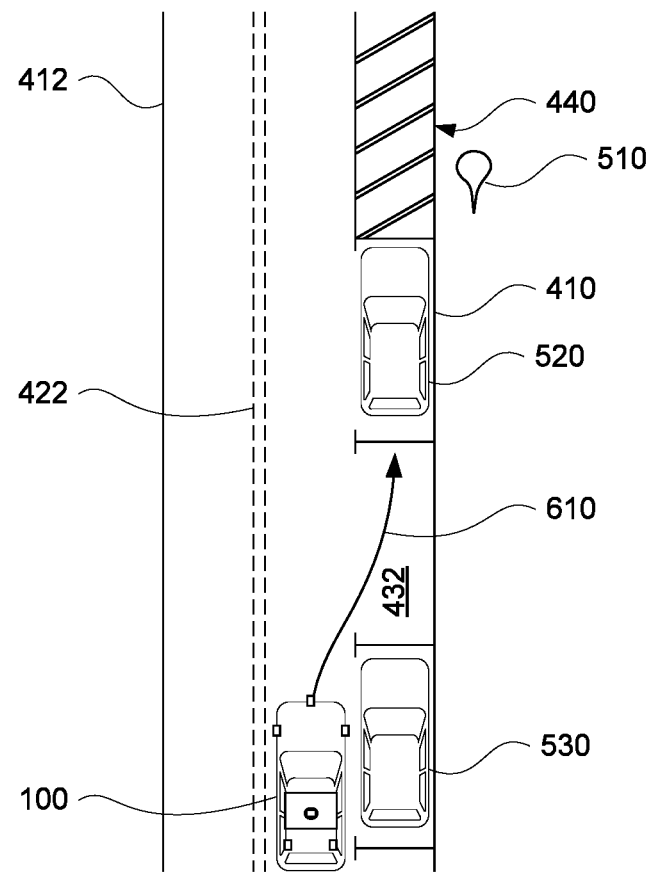
FIG. 6 is an example of a vehicle having an autonomous driving mode in the section of roadway of FIG. 4 in accordance with aspects of the disclosure.
Figure 7:
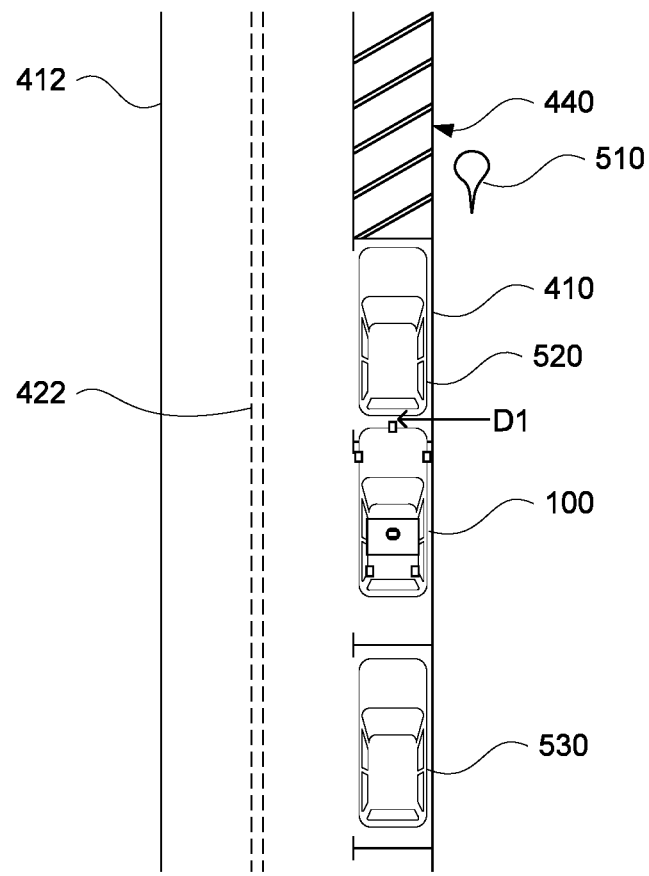
FIG. 7 is an example of a vehicle having an autonomous driving mode in the section of roadway of FIG. 4 in accordance with aspects of the disclosure.

Returning to FIG. 10, at block 1020, the vehicle is maneuvered in the autonomous driving mode in order to pull over and pull forward into the pullover location. Once the vehicle 100 is ready to pull over into an identified pullover location, the vehicle's planning system may implement pull over behavior. This may involve the computing devices 110 maneuvering vehicle 100 autonomously in order to cause the vehicle to pull forward into the identified pullover location and stopping the vehicle 100. For instance, turning to FIG. 6, the computing devices 110 may use the planning system 168 to generate trajectory 610. Thereafter, the computing devices 110 may control the vehicle 100 in order to follow the trajectory 610 as described above. FIG. 7 represents the vehicle 100 after it has pulled into the identified pullover location (here parking spot 432).

Typically, when in driving situations, the computing devices 110 may always attempt to maintain a minimum distance between the vehicle 100 and other road users. For example, when coming to a stop at a traffic intersection, the vehicle 100 may always stop at least 2 meters or more or less behind another stopped vehicle. However, when pulling into an identified pullover location, the pull over behavior may cause this minimum distance to be adjusted, for instance decreased to a much smaller distance such as 0.15 meters (approximately 6 inches) or more or less. For instance, as shown in FIG. 7, the distance between vehicle 100 and vehicle 520, here D1, may be just a few inches or more or less. By allowing a vehicle to pull so close to another object, this may also require the vehicle to reverse before being able to pull out of the identified pullover location.

Figure 8:
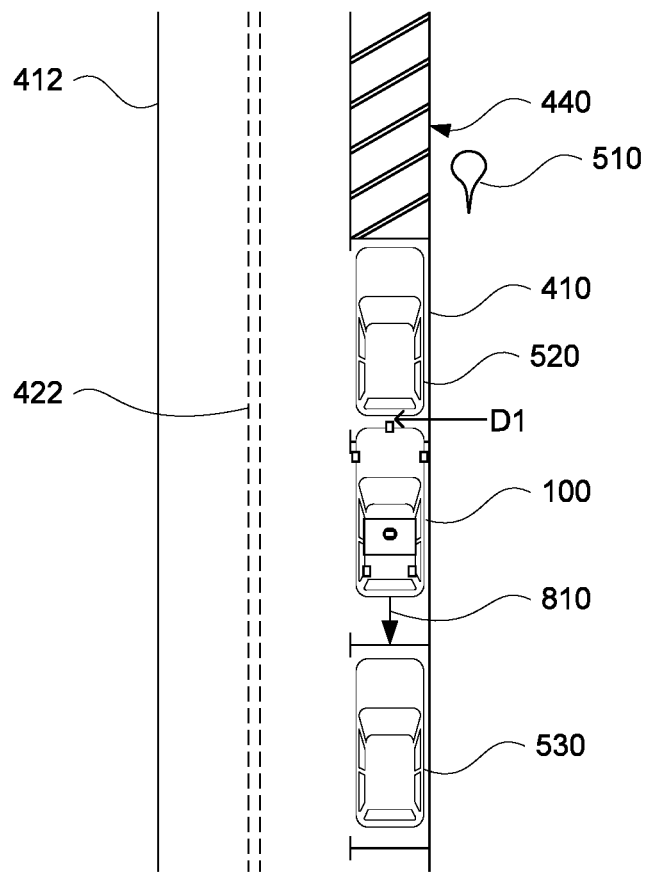
FIG. 8 is an example of a vehicle having an autonomous driving mode in the section of roadway of FIG. 4 in accordance with aspects of the disclosure.

Returning to FIG. 10, at block 1030, whether to maneuver the vehicle in reverse in the pullover location before or after the passenger enters the vehicle based on context for the pull over with respect to the passenger is determined. At the point where the vehicle 100 is maneuvered in order to pull over by pulling forward or shortly before when the vehicle is approaching the identified pullover location, the computing devices 110 may determine whether the vehicle should immediately reverse in order to create a gap between the vehicle and another object (such as another parked vehicle). In some cases, reversing may not be required, such as where there is no pullover location in front of the vehicle 100 (i.e. no parking in front of the vehicle); however, in many cases, it may be useful to reverse in order to prepare the vehicle 100 to pull out of the identified pullover location. Turning to FIG. 8, the planning system 168 may generate a trajectory 810 for the vehicle 100 to follow in order to reverse in the pullover location (here parking spot 432) to make a gap between vehicle 100 and vehicle 520. Of course, as noted above, the computing devices 110 must determine when the vehicle 100 should reverse along trajectory 810 before or after the passenger has entered the vehicle 100.

In order to determine whether the vehicle 100 should reverse before or after the passenger has entered the vehicle, the computing devices 110 may determine context for the pull over with respect to the passenger for the vehicle. For instance, if the context indicates that the actual passenger or a potential passenger (i.e. a pedestrian who may be the passenger) is nearby, the computing devices 110 should wait for the passenger to enter the vehicle 100 (and also close the door and/or buckle a seatbelt or other restraint device) before maneuvering the vehicle in reverse. If the context indicates that the actual passenger or a potential passenger is not nearby the vehicle, the computing devices 110 may maneuver the vehicle 100 in reverse before the passenger enters the vehicle. This may include reversing away from an object, such as vehicle 520, in front of the vehicle 100.

In some instances, despite the context indicating that the passenger is likely to be nearby, the computing devices 110 may still determine that reversing before the passenger enters the vehicle, is in fact prudent in order to prevent the vehicle 100 from being "boxed in" by one or more other vehicles. This may be the case, for instance because another vehicle may be approaching the vehicle 100 from behind and appears to be pulling behind the vehicle 100 or because another vehicle behind the vehicle 100 is pulling out of a pullover location behind the vehicle 100 (such as, for example, vehicle 530 in parking spot 430). This may also be the case in high traffic areas where historically vehicles are attempting to locate and pull into parking spots and other pullover locations at the same or similar times (i.e. same date and time, same day of the week, etc.), even if the perception system is not actually observing a vehicle pulling in or out. For example, the computing devices 110 may have access to historical information about the volume of traffic in certain areas and/or the number of vehicles that were parked in a pullover location in the past. In those cases, it may be prudent to reverse in order to preserve space for the vehicle 100 to be able to pull out.

In addition, the computing devices 110 may estimate a time to complete a maneuver, such as pulling into a pullover location, reversing and/or pulling the vehicle forward. For example, the estimated time to pull into a pullover location and reverse exceeds an estimate of how much time before the passenger is likely to arrive at the vehicle 100 (discussed further below), the computing devices 110 may determine that the vehicle should abandon the maneuver altogether (e.g. double park or simply stop and wait). As another example, if the vehicle is already located within the pullover location and the estimated time to pull forward and then reverse exceeds an estimate of how much time before the passenger is likely to arrive at the vehicle 110, the computing devices 110 may control the vehicle to pull into the pullover location forward (without reversing), wait for the passenger to board the vehicle, and thereafter reverse. As another example, if the estimated time to pull forward and then backup exceeds an estimate of how soon another vehicle is likely to arrive at the vehicle 110 and "box" the vehicle into the pullover location from in front of the vehicle, the computing devices 110 may determine to maneuver the vehicle 110 forward in the pullover location and wait for the passenger to board, and thereafter reverse. This estimate of how soon another vehicle is likely to arrive at the vehicle 110 may be based on historical data for the pullover location or area around the pullover location and/or observations of the number of vehicles pulling into nearby pullover locations, the current volume of traffic, time of day, day of the week, day of the year, etc.

As another example, if a vehicle in front of the vehicle 110 (such as, for example, vehicle 520 in parking spot 434) is likely to be leaving shortly, the computing devices 110 may actually pull the vehicle forward, rather than reversing despite the context indicating that the passenger is likely to be nearby, the computing devices may actually pull the vehicle forward in order to preserve space. For example, if certain signals are observed by the perception system such as a person entering the other vehicle, a turn signal being activated, exhaust appearing from the other vehicle, etc., the computing devices 110 may determine that the other vehicle is likely to be pulling out of a pullover location. Again, in such cases, the computing devices may actually pull the vehicle forward in order to preserve space.

When the computing devices 110 determine that the vehicle should reverse or pull forward despite the context indicating that the passenger is likely to be nearby, the computing devices 110 may communicate a message to the passenger via external tertiary communications systems (for example audio via a speaker, displaying on a display screen, etc.) or by sending a message (for example, via network 460), to the passengers client computing device, to indicate to the passenger that the passenger should wait for the vehicle to complete a reversing maneuver before attempting entering the vehicle.

In some instances, determining the context may include determining how much time before the passenger is likely to arrive at the vehicle 100. This determination may be made for instance, based on location information for a client computing device associated with the passenger. For example, the computing devices 110 may periodically receive location information (such as GPS coordinates) generated by the passenger's client computing device (e.g. mobile phone). This location information may be received from a server computing device of a dispatching system for the vehicle 100 and/or directly from the client computing device. The computing devices 110 may determine if this location information indicates that the passenger is likely to reach the vehicle 100's current location within a predetermined threshold period of time assuming a normal walking speed, such as 2 meters per second. If so, this may indicate that the actual passenger is nearby the vehicle 100, and in such circumstances, the computing devices 110 should wait for the passenger to enter the vehicle 100 before maneuvering the vehicle in reverse. If not, the computing devices 110 may maneuver the vehicle 100 in reverse before the passenger enters the vehicle.

Alternatively, the computing devices 110 may determine how much time before the passenger is likely to arrive at the vehicle 100 based on historical data for the passenger and/or other passengers. For instance, the historical data may include aggregated statistics about how long on average this passenger and/or other passengers take to reach a vehicle once a vehicle is stopped to pick up such passengers at the identified pullover locations, nearby pullover locations (e.g. no more than 50 meters in walking distance or straight line distance away or more or less), or other similar locations (such as similarly sized or situated parking lots or similar types of stores). The historical data may also be "sliced" that is segmented for different predetermined times of day and/or days of the week. This historical data may be embedded in map information and associated with geographic regions including a plurality of pullover locations and/or with specific pullover locations. From this historical data, the computing devices 110 may determine an expected amount of time for the passenger to reach the vehicle 100.

The computing devices 110 may then determine if this expected amount of time indicates that the passenger is likely to reach the vehicle 100's current location within a predetermined threshold period of time assuming a normal walking speed (which may be 2 meters per second or more or less). If so, this may indicate that the actual passenger is nearby the vehicle 100, and in such circumstances, the computing devices 110 should wait for the passenger to enter the vehicle before maneuvering the vehicle in reverse. If not, the computing devices 110 may maneuver the vehicle 100 in reverse before the passenger enters the vehicle.

In addition or alternatively, determining the context may include determining whether there are any pedestrians nearby of the vehicle 100. For example, the computing devices 110 may use sensor data from the vehicle 100's perception system to identify or detect pedestrians within a predetermined threshold distance of the vehicle 100, for example within 100 meters or more or less. This may indicate that a potential passenger is nearby the vehicle 100 and possibly ready to approach the vehicle, and in such circumstances, the computing devices 110 should wait for the passenger to enter the vehicle before maneuvering the vehicle in reverse. If not, the computing devices 110 may maneuver the vehicle 100 in reverse before the passenger enters the vehicle.

In addition or alternatively, determining the context may include determining whether there are any pedestrians who are actively making progress towards the vehicle 100. For example, the computing devices 110 may predict a future trajectory for the object and if it overlaps with the location of the vehicle 100, this may indicate that the pedestrian is actively making progress towards the vehicle. Again, this may indicate that a potential passenger is nearby the vehicle 100 and possibly approaching the vehicle, and in such circumstances, the computing devices 110 should wait for the passenger to enter the vehicle before maneuvering the vehicle in reverse. If not, the computing devices 110 may maneuver the vehicle 100 in reverse before the passenger enters the vehicle.

In addition or alternatively, determining the context may include determining whether the computing devices 110 have established a communications link with and/or authenticated a client computing device associated with the passenger (whether or not a pedestrian is detected nearby the vehicle 100). For example, once within a certain distance or time, such as 50 meters or more or less or 25 seconds or more or less, of a pickup location for the passenger, the computing devices 110 may attempt to establish a Bluetooth® communication link between the passenger's client computing device (e.g. mobile phone) and the computing devices 110. Once this has occurred, because Bluetooth® connections are generally made over fairly short distances, this may indicate that the actual passenger is nearby the vehicle 100, and in such circumstances, the computing devices 110 should wait for the passenger to enter the vehicle 100 before maneuvering the vehicle in reverse. If not, the computing devices 110 may maneuver the vehicle 100 in reverse before the passenger enters the vehicle.

In addition or alternatively, determining the context may include determining whether location information for a client computing device of the passenger indicates that the passenger is nearby the vehicle 100. For example, the computing devices 110 may periodically receive location information (such as GPS coordinates) generated by the passenger's client computing device (e.g. mobile phone). This location information may be received from a server computing device of a dispatching system for the vehicle 100 and/or directly from the client computing device. The computing devices 110 may determine if this location information indicates that the passenger is within a predetermined threshold distance, such as 100 meters or more or less, of the current location of the vehicle 100. If so, this may indicate that the actual passenger is nearby the vehicle 100, and in such circumstances, the computing devices 110 should wait for the passenger to enter the vehicle before maneuvering the vehicle in reverse. If not, the computing devices 110 may maneuver the vehicle 100 in reverse before the passenger enters the vehicle.

Returning to FIG. 10, at block 1040, the vehicle is maneuvered in the autonomous driving mode in reverse based on the determination of whether to maneuver the vehicle in reverse in the pullover location before or after the passenger enters the vehicle. For instance, based on the examples above, if any of the context indicates that the vehicle 100 should wait for the passenger to enter the vehicle 100, then the computing devices 110 may wait for a passenger to enter a vehicle, for instance in the location depicted in FIG. 7, before following trajectory 810 in order to reverse. Again, the vehicle 100 may be maneuvered in the autonomous driving mode towards vehicle 520, and the distance between vehicle 100 and vehicle 520, here D2 in FIG. 9 may be on the order of a few inches or more or less. The computing devices 110 may then wait for the passenger to enter the vehicle. This may be confirmed, for instance by the door of the vehicle being opened and closed and/or a passenger initiating a ride, for example, by pressing a button within the vehicle or by speaking a command for the ride to start which may also cause the computing devices 110 to automatically close the doors of the vehicle. At some point, the planning system 168 may also generate trajectory 910 in order to enable the vehicle 100 to pull out of the pullover location (here parking spot 432). In this regard, after the passenger has entered the vehicle 100, the computing devices 110 may also control the vehicle in the autonomous driving mode in order to follow trajectory 910.

Figure 9:
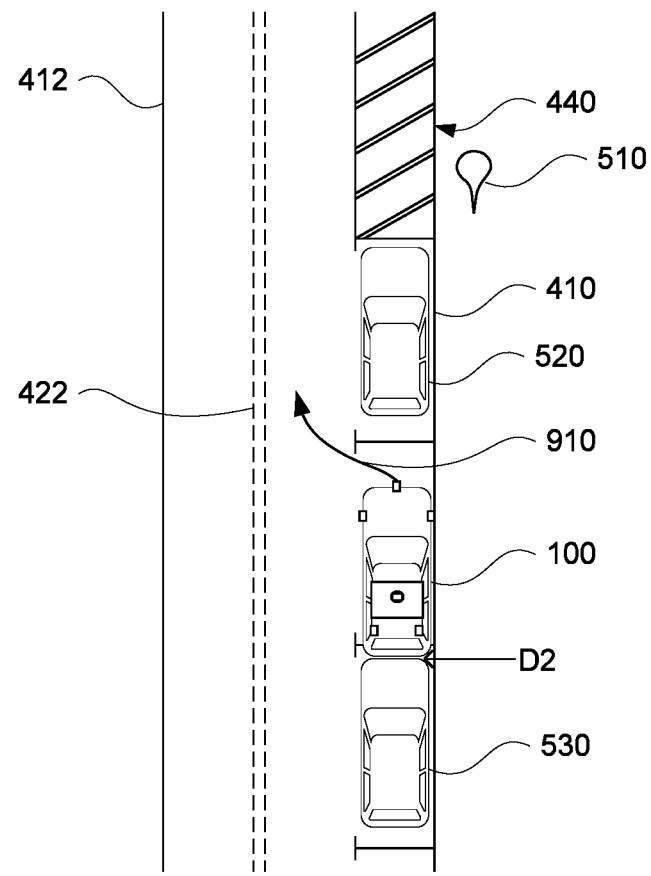
FIG. 9 is an example of a vehicle having an autonomous driving mode in the section of roadway of FIG. 4 in accordance with aspects of the disclosure.

If none of the context indicates that the vehicle 100 should wait for the passenger to enter the vehicle, then the computing devices 110 may control the vehicle to follow trajectory 810 as depicted in FIG. 9 before waiting for the passenger to enter the vehicle. Again, the vehicle 100 may be maneuvered in the autonomous driving mode towards vehicle 520, and the distance between vehicle 100 and vehicle 520, here D2 in FIG. 9 may be on the order of a few inches or more or less. At some point, the planning system 168 may generate trajectory 910 in order to enable the vehicle 100 to pull out of the pullover location (here parking spot 432). In this regard, once the passenger has entered the vehicle, the computing devices 110 may also control the vehicle in the autonomous driving mode in order to follow trajectory 910.

The features described herein may enable an autonomous vehicle to implement specific parking behaviors. As noted above, these parking behaviors may improve the ability for the computing devices of a vehicle having an autonomous driving mode to find available pullover locations while doing so safely and avoiding parallel parking maneuvers. In other words, because the vehicle is able to find smaller parking locations (for instance, a 5.1-5.2 meter long van may be able to pull over in an 8 to 10 meter pullover location as opposed to a 15 or more meter pullover location), the vehicle may be more likely to find a pullover location to wait for a passenger and less likely to have to loop around one or more times before doing so. In addition, because the timing of when a vehicle reverses in a pullover location is dependent upon the context for the pull over with respect to a potential or actual passenger for the vehicle, this may avoid situations in which the vehicle stops and an unknowing passenger attempts to enter the vehicle just before or while the vehicle is reversing, which again can be dangerous for the passenger.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of maneuvering a vehicle having an autonomous driving mode, the method comprising:
   identifying, by one or more processors, a pullover location for the vehicle to stop and wait for a passenger;
   maneuvering, by the one or more processors, the vehicle in the autonomous driving mode in order to pull over by pulling forward into the pullover location;
   determining, by the one or more processors, whether to maneuver the vehicle in reverse in the pullover location before or after the passenger enters the vehicle based on context for the pull over with respect to the passenger; and
   maneuvering, by the one or more processors, the vehicle in the autonomous driving mode in reverse based on the determination of whether to maneuver the vehicle in reverse in the pullover location before or after the passenger enters the vehicle.

2. The method of claim 1, further comprising, when maneuvering the vehicle in order to pull over by pulling forward into the pullover location, adjusting a minimum distance for the vehicle with respect to other objects in order to maneuver the vehicle within the adjusted minimum distance of another object in front of the vehicle.

3. The method of claim 1, further comprising, determining the context by determining that a pedestrian is within a predetermined threshold distance of the pullover location, and wherein maneuvering the vehicle in reverse includes maneuvering the vehicle in reverse after the passenger enters the vehicle.

4. The method of claim 1, further comprising, determining the context by determining that no pedestrian is within a predetermined threshold distance of the pullover location, and wherein maneuvering the vehicle in reverse includes maneuvering the vehicle in reverse before the passenger enters the vehicle.

5. The method of claim 1, further comprising:
   determining the context by determining an expected amount of time for the passenger to reach the vehicle once the vehicle is ready to be maneuvered in reverse in the pullover location; and
   comparing the expected amount of time to a threshold value, and wherein the determination of whether to maneuver the vehicle in reverse in the pullover location before or after the passenger enters the vehicle is further based on the comparison.

6. The method of claim 5, wherein maneuvering the vehicle in reverse includes maneuvering the vehicle in reverse before the passenger enters the vehicle when the comparison indicates that the expected amount of time is greater than the threshold value.

7. The method of claim 5, wherein maneuvering the vehicle in reverse includes maneuvering the vehicle in reverse after the passenger enters the vehicle when the comparison indicates that the expected amount of time is less than the threshold value.

8. The method of claim 5, wherein the determining the expected amount of time is based on location information for a client computing device associated with the passenger.

9. The method of claim 8, wherein determining the expected amount of time is further based on a predetermined walking speed for pedestrians.

10. The method of claim 5, wherein the determining the expected amount of time is based on historical data indicating how long it has taken the passenger to reach one or more vehicles for a pick up in the past.

11. The method of claim 5, wherein the determining the expected amount of time is based on historical data indicating an expected amount of time for passengers to reach one or more vehicles for a pick up.

12. The method of claim 5, wherein the determining the expected amount of time is based on historical data indicating an expected amount of time for passengers to reach one or more vehicles for a pick up at a predetermined time of day.

13. The method of claim 5, wherein the determining the expected amount of time is based on historical data indicating an expected amount of time for passengers to reach one or more vehicles for a pick up on a predetermined day of the week.

14. The method of claim 5, wherein the determining the expected amount of time is based on historical data indicating an expected amount of time for passengers to reach one or more vehicles for a pick up at the pullover location.

15. The method of claim 5, wherein the determining the expected amount of time is based on historical data indicating an expected amount of time for passengers to reach one or more vehicles for a pick up at a geographic region including the pullover location and one or more additional pullover locations.

16. The method of claim 1, further comprising, determining the context by determining that a pedestrian who is making progress towards the vehicle is within a predetermined distance of the pullover location, and wherein maneuvering the vehicle in reverse includes maneuvering the vehicle in reverse after the passenger enters the vehicle.

17. The method of claim 1, further comprising, determining the context by determining that no pedestrian who is making progress towards the vehicle is within a predetermined distance of the pullover location, and wherein maneuvering the vehicle in reverse includes maneuvering the vehicle in reverse after the passenger enters the vehicle.

18. The method of claim 1, further comprising, determining the context by determining that a communication link has been established between one or more computing devices of the vehicle and a client computing device associated with the passenger, and wherein maneuvering the vehicle in reverse includes maneuvering the vehicle in reverse after the passenger enters the vehicle.

19. The method of claim 1, further comprising, determining the context by determining that no communication link has been established between one or more computing devices of the vehicle and a client computing device associated with the passenger, and wherein maneuvering the vehicle in reverse includes maneuvering the vehicle in reverse before the passenger enters the vehicle.

20. The method of claim 1, further comprising, determining the context by determining that location information for a client computing device associated with the passenger is within a predetermined threshold distance of the vehicle, and wherein maneuvering the vehicle in reverse includes maneuvering the vehicle in reverse after the passenger enters the vehicle.

21. The method of claim 1, further comprising, determining the context by determining that location information for a client computing device associated with the passenger is not within a predetermined threshold distance of the vehicle, and wherein maneuvering the vehicle in reverse includes maneuvering the vehicle in reverse before the passenger enters the vehicle.

22. The method of claim 1, wherein maneuvering the vehicle in reverse includes maneuvering the vehicle in reverse before the passenger enters the vehicle, and the method further comprises providing a notification to indicate to the passenger that the passenger should wait for the vehicle to complete a reversing maneuver before attempting entering the vehicle.

* * * * *